United States Patent [19]
Gladfelter et al.

[11] Patent Number: 5,718,956
[45] Date of Patent: Feb. 17, 1998

[54] REFLECTIVE FOAM SLEEVE

[75] Inventors: Harry F. Gladfelter, Kimberton, Pa.; David T. Pindar, Daventry; Alan W. Atkinson, Barby, both of England

[73] Assignee: Bentley-Harris Inc., Exton, Pa.

[21] Appl. No.: 728,129

[22] Filed: Sep. 30, 1996

Related U.S. Application Data

[63] Continuation of Ser. No. 365,709, Dec. 29, 1994, abandoned.

[51] Int. Cl.$^6$ .................... F16L 59/02; B32B 15/08
[52] U.S. Cl. ............... 428/35.9; 428/36.5; 428/36.91; 428/336; 428/339; 138/138; 138/143; 138/146
[58] Field of Search .................. 428/336, 339, 428/36.8; 138/138, 146

[56] References Cited

U.S. PATENT DOCUMENTS

| | | | |
|---|---|---|---|
| 2,858,854 | 11/1958 | Daggett | 138/56 |
| 2,959,508 | 11/1960 | Graham et al. | 154/100 |
| 3,707,433 | 12/1972 | Clough et al. | 161/143 |
| 4,139,024 | 2/1979 | Adorjan | 138/149 |
| 4,240,850 | 12/1980 | Arntz | 156/78 |
| 4,246,057 | 1/1981 | Janowski et al. | 156/150 |
| 4,271,218 | 6/1981 | Heckel et al. | 428/36 |
| 4,287,245 | 9/1981 | Kikuchi | 428/36 |
| 4,307,756 | 12/1981 | Voigt et al. | 428/35.9 |
| 4,396,142 | 8/1983 | Lines, Jr. et al. | 229/3.5 |
| 4,511,611 | 4/1985 | Molsson | 428/35 |
| 4,531,991 | 7/1985 | Ziemek et al. | 156/79 |
| 4,606,957 | 8/1986 | Cohen | 428/40 |
| 4,731,271 | 3/1988 | Heucke et al. | 428/36 |
| 4,744,842 | 5/1988 | Webster et al. | 428/35.9 |
| 4,794,026 | 12/1988 | Boultinghouse | 428/35.9 |
| 4,865,891 | 9/1989 | Larsson | 428/35.9 |
| 4,871,597 | 10/1989 | Hobson | 428/36.1 |
| 4,874,648 | 10/1989 | Hill et al. | 428/35.9 |
| 4,900,383 | 2/1990 | Dursch et al. | 156/194 |
| 4,906,494 | 3/1990 | Babinec et al. | 428/35.2 |
| 5,405,665 | 4/1995 | Shukushima et al. | 428/34.5 |

FOREIGN PATENT DOCUMENTS

| | | |
|---|---|---|
| 2295837 | 7/1976 | France. |
| 2641484 | 9/1976 | Germany. |
| 3015387 | 4/1982 | Germany. |
| 62-188843 | 8/1987 | Japan. |
| 955960 | 4/1964 | United Kingdom. |
| 2099542 | 12/1982 | United Kingdom. |
| 2136528 | 4/1986 | United Kingdom. |

*Primary Examiner*—Rena Dye
*Attorney, Agent, or Firm*—Synnestvedt & Lechner

[57] ABSTRACT

A sleeving product and a method for making a sleeving product suitable for use as a barrier for resisting heat transfer between an external heat source and an elongated substrate, comprising: a tubular layer comprising a flexible, resilient foamed insulating material; and an exterior cover layer bonded to one surface of the tubular layer, the cover layer comprising a metalized polymeric film, the metalized polymeric film comprising a flexible polymeric film and a nonporous, thin coating of heat reflective metal applied to at least one surface of the polymeric film.

16 Claims, 2 Drawing Sheets

REFLECTIVE FOAM SLEEVE

This is a continuation of U.S. application Ser. No. 08/365,709 filed on Dec. 29, 1994, which is now abandoned.

FIELD OF THE INVENTION

This invention is directed to a sleeving product suitable for use as a barrier for resisting heat transfer from a source of radiant heat, and a method for making same.

BACKGROUND OF THE INVENTION

In many circumstances, the requirement arises for a flexible sheet material which can be used for resisting heat transfer from sources of radiant heat, namely, sources of infra-red radiation. For example, such sheet material may be formed into flexible tubing of the kind commonly used to protect components such as electrical wiring, brake and fuel lines from heat, particularly the heat sources found in automotive engine compartments. An important requirement for such tubing is flexibility, which for present purposes includes the properties of bendability, the ability to stretch circumferentially, shape retention and ease of installation, together with the ability to resist heat transfer to the substrate to be protected. Such flexible sheet materials may, in addition to their ability to keep items cool, alternatively be used to keep items warm by resisting heat transfer away therefrom.

A currently used product for providing such protection and insulation is a tube or sleeve comprising a foamed substrate, which is comprised of a material such as PVC/nitrile or urethane; however, such sleeving offers little or no effective protection from radiant heat. Where a radiant heat source is in close proximity, the foam tube will degrade and disintegrate, falling away and thus exposing the hose or other protected component. Some attempts to reinforce the tubing to prevent such disintegration have involved, for example, the use of a polymeric transfer film. Transfer film comprises a polyester film layer, an aluminum deposition layer and an adhesive layer and, when applied to a substrate, the polyester film is lifted off, leaving only the aluminum and the adhesive. Transfer film has been found to offer little protection from radiant heat. Other attempts to prevent foam disintegration have involved the use of materials such as glass fabrics and graphite paper, which have been found to render the sleeve stiff and inflexible.

Because resistance to heat transfer is predominately a function of reflectivity, known techniques have focused on imparting reflective properties to the sleeving. The most important heat transfer mechanism is radiation at infra-red wavelengths. Accordingly, it is known to apply to the sleeving a foil of metal, such as aluminum, which demonstrates good infra-red reflectivity. One known method for protecting products such as electrical wiring and brake or fuel lines is to envelope the tubing in a layer of aluminum foil by wrapping it with a foil strip, either spirally or longitudinally. Because very thin foils are so fragile, typically the foil is at least 20 microns in thickness. The foil is retained in place by adhesive or by stitching. However, while the resultant product has good reflectivity, it suffers from severely impaired flexibility. Another, more recent technique involves coating the sleeving with a layer of metallic paint. Metallic paint comprises a polymeric resin material, such as an acrylic latex emulsion or a urethane, containing metallic particles, for example, aluminum, preferably in the form of flakes. While this gives reasonably good flexibility, the infra-red reflectivity is not as good as might be expected from the properties of an individual flake. It is believed that the reason for this is the individual nature of the metal flakes, which allows gaps to exist between flakes; and, in connection with these gaps, the absorption by the polymeric material, both before reflection and after, since the main constituent of the paint is the polymer system and thus the flakes (usually less then 10% by weight) alone do not constitute the entire surface layer; and also because the metallic paint lacks the smooth surface characteristics required for producing the desired high reflectivity.

OBJECTS OF THE INVENTION

It is an object of the present invention to provide a low cost sleeving product which is suitable for use as a barrier for resisting heat transfer from a source of radiant heat.

It is an additional object of this invention to provide a heat resistant sleeving product which combines good reflectivity with good flexibility and durability.

It is a further object of this invention to provide a heat resistant sleeving product which provides a reduced susceptibility to abrasion, tearing or other types of damage to the reflective coating, thereby maintaining its reflective properties and, thereby, its heat resistance.

It is still a further object of this invention to provide a heat resistant sleeving product which is substantially impervious to fluids and which also reduces noise and vibration.

SUMMARY OF THE INVENTION

The present invention provides a sleeving product which is suitable for use as a barrier for resisting heat transfer between an external heat source and an elongated substrate, comprising: a tubular layer comprising a flexible, resilient foamed insulating material; and an exterior cover layer bonded to one surface of the tubular layer, the cover layer comprising a metalized polymeric film, the metalized polymeric film comprising a flexible polymeric film and a nonporous, thin coating of heat reflective metal applied to at least one surface of the polymeric film. As distinguished from paints or foils, the metal coatings of this invention are applied to the film substrate in vapor form.

According to the preferred embodiment, the polymeric film and the heat reflective metal of the cover layer are combined to provide a thin, flexible and stretchable membrane which is secured to the foam layer by a bonding layer which is preferably formed by the application of an adhesive, the heat reflective metal being applied as an extremely thin, complete coating on the polymeric film which is secured to the foam layer by the bonding layer. The polymeric film is additionally lightweight and durable, and importantly functions as the vehicle which permits the application of the extremely thin layer of reflective metal to the surface of the foam tube in a way which does not impair the flexibility of the tubing and which also imparts flexibility to the thin metal coating itself.

The extremely thin coating of heat reflective metal preferably comprises aluminum which is applied by known metalizing methods. Although other metals and metalizing methods may prove satisfactory, in the presently preferred embodiments vacuum-depositing the aluminum in vapor form onto the polymeric film is highly effective and is preferred. According to vacuum depositing techniques, the aluminum is thermally evaporated under vacuum, the vacuum environment allowing the metal atoms to condense onto the polymeric film substrate as an extremely thin, yet complete, nonporous, continuous, unbroken, highly reflective layer of metal. More specifically, the polymeric film is placed in a chamber and a hard vacuum is drawn. The film is taken over a chill roll. Metal rods are fed into an electric arc where the metal is melted at a high temperature into a "boat." The molten aluminum then vaporizes almost instantaneously and condenses onto the film on the chilled roll. Such a coating is preferably applied as thin as just a few atomic layers, i.e. up to about 0.1 micron, which is much thinner than any foil or metallic paint. The amount of aluminum deposited is regulated by the speed of the film over the chill roll and the speed of the feed of aluminum to the "boat."

Metal foils are typically at least 20 microns in thickness because they are so fragile, due to their inflexibility. Although thinner metal foils are available, namely foils of about 5 to about 10 microns in thickness, it is difficult to apply such foils onto a substrate in a smooth fashion and without tearing or wrinkling of the foil. In particular, even though sleeves comprising thin foil laminated to film and applied to a foam layer with adhesive may initially provide adequate protection from heat, the film beneath the foil tends to wrinkle and shrivel, at the same time wrinkling and shriveling the foil along with it. Unlike the metalized film of this invention, the foil does not "recover" and the sleeve maintains a shriveled appearance, the result of which is a less effective reflective surface.

Metallic paints are typically at least 2 microns in thickness or at least twenty times as thick as the metal layers contemplated by the teachings of the invention and, by nature of the metal flakes in combination with the polymer material, the metal is not as reflective and is unable to be applied as thin as just a few atomic layers, thereby impairing flexibility. In contrast to metal paint coatings, the coating of this invention is importantly so thin that it is able, when applied, to follow the contours of the foam substrate. The very thin metal coating, such as can be achieved by vacuum depositing, takes on the smoothness of the foam substrate, thereby providing a very smooth and thus a bright and highly reflective surface.

It is contemplated that the polymeric film may be metalized on either the inner or outer surface thereof, or on both its inner and outer surfaces. It is further preferred that the polymeric film comprises polyester. While other polymeric films may be suitable, polyester lends itself to the metalizing process, is relatively inexpensive, flexible and readily commercially available in a metalized form. Furthermore, it has been found that the polyester film is, in itself, an excellent thermal insulator.

The reflective foam sleeve manufactured in accordance with the present invention provides a highly radiant heat reflective product which retains much of the flexibility of the uncovered foam, which insulates hosing or other protected components, thereby reducing the effect of radiant heat and protecting against foam degradation over a broader range of temperatures than the prior art, and which is substantially impervious to fluids while also reducing noise and vibration.

The reflective foam sleeve as herein described is preferably constructed according to the following method. In particular, the present invention provides a method of making a sleeving product suitable for use as a barrier for resisting heat transfer between an external heat source and an elongated substrate, which comprises forming a tubular layer comprising a flexible, resilient foamed insulating material; forming an exterior cover layer for the tubular layer, the exterior cover layer comprising a metalized polymeric film, the metalized polymeric film comprising a flexible polymeric film and a nonporous, thin coating of heat reflective metal deposited on at least one surface of the polymeric film; and bonding the metalized polymeric film to the outer surface of the tubular layer, preferably by the use of an adhesive.

Alternatively, the method comprises first forming the exterior cover layer and thereafter forming the foamed tubular layer inside the exterior cover layer, the foamed material of the tubular layer bonding the resulting tubular layer to the exterior cover layer as the foamed material is cured.

DETAILED DESCRIPTION OF THE INVENTION

Figure 1:
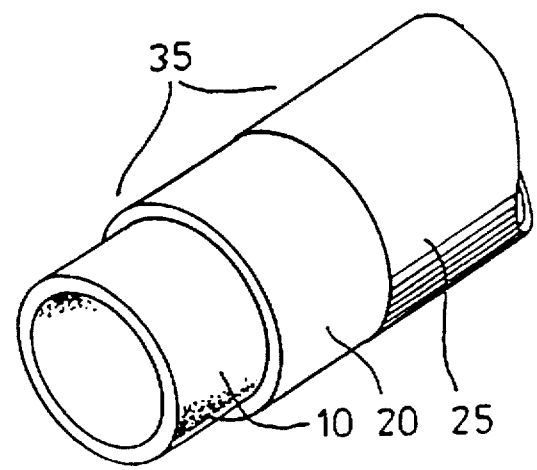
FIG. 1 illustrates a schematic perspective view of the reflective foam sleeve of the present invention, partly cut away to show its construction.

The reflective foam sleeve of the present invention, the preferred embodiment of which is illustrated schematically in FIG. 1, comprises a foam insulating tubular layer 10 and an exterior cover layer 35 comprising a thin, flexible polymeric film 20 which has been metalized with an extremely thin metal coating 25, and which is bonded to the foam layer 10 at the interface of the foam layer and the exterior cover layer.

The foam insulating layer 10 of this invention is lightweight and flexible, comprising a material which, when foamed, imparts resilience and flexibility, as well as thermal insulation, to the sleeve. Such resilience is important in reducing vulnerability of the sleeve to abrasion damage. The foamed material is intended to provide a flexible substrate, thereby making it possible to apply a thin layer of metalized polymeric film without having the film wrinkle or buckle. In addition, it is important that the foamed material provide a substantially smooth exterior surface for the metalized polymeric film layer, thus promoting adherence of the metalized film and allowing the metalized film surface to remain smooth. Such surface smoothness is an important factor in obtaining high reflectivity. Because the metalized films utilized in this invention are so thin, they tend to closely follow substrate contours; while a metalized film deposited on a rough surface demonstrates a dull appearance, the same film deposited on a smooth surface exhibits a bright, highly reflective appearance. Finally, the foam insulating layer should be available at a reasonable cost.

Foam tubing products which satisfy these requirements are well known in the art. One such product comprises closed cell PVC/nitrile foam. A suitable closed cell PVC/nitrile foam in tubular form, having the product name "Insultube," is available from Halstead Industries, Inc. of Greensboro, N.C. Also suitable, although less dense than the Halstead Insultube product, is a preformed closed cell PVC/nitrile foam tubing exhibiting larger sponge, as available from Rubatex Corporation of Bedford, Va. Other flexible, resilient and thermally insulating materials which can be foamed or fabricated in tubular form, such as urethane or the like, may also be employed.

Although it is intended for most applications that the inner layer of the present invention consist essentially of a flexible, resilient foamed insulating material, added strength may be imparted to the product by providing a knitted, braided or woven fabric support. Where the fabric support is woven, the long axis of the tube may be arranged to extend at substantially 45 degrees to the direction of the weft of the weave. This has been found to increase the flexibility of the tube as compared to woven tubes not so oriented. The fabric support may be formed from glass fiber, aromatic polyamide fiber or regenerated cellulose fiber, including blends thereof. When the fabric support is located on the inner surface of the foam tubing, the foam layer on the fabric support tends to smooth out the surface irregularities of the support, thereby ensuring the relative smooth surface required for obtaining good reflectivity. In certain circumstances it might be acceptable to place the fabric support on the outside surface of the foam tubing; however, wrinkling of the metal coating may occur with a sacrifice of reflectivity of the metal due to the irregular surface of the fabric support.

As noted above, the exterior cover layer 35 of this invention importantly comprises a thin polymeric film 20 and an extremely thin coating 25 thereon comprised of heat reflective metal.

The thin polymeric film is flexible, resilient, stretchable and durable. The film preferably has a thickness of about 12 to about 25 microns. In certain circumstances, films up to 50 microns are suitable. The thicker films may be found to be satisfactory for some purposes, but only to the extent that the film does not lose the necessary flexibility which is importantly imparted to the thin layer of reflective metal. While thicker films may provide increased thermal resistance, the final thickness of the film is dependent upon a balance between thermal resistance and flexibility. The optimum value for film thickness can be obtained via a few field trials.

The film selected has been found to be resistant to heat and to unexpectedly provide some insulating effect. While the metal coating is resistant to heat and acts to reflect heat, the metal alone provides no insulating effect. Additionally, the thin polymeric film in itself makes it possible to apply a very thin coating of metal to the foam tube without tearing the metal coating. The film serves as a vehicle for the application of an extremely thin layer of reflective metal to the surface of the foam tube in a way which importantly does not impair the flexibility of the tubing and which also imparts that flexibility to the metal coating itself. The resulting metalized polymeric film distinctively retains its flexibility and is capable of stretching without breaking. It is preferred that the polymeric film comprises polyester, although other polymeric films satisfying the above requirements may be employed. A film comprising polyester is found to be excellent for the purposes of this invention in that it possesses the properties noted above and is relatively inexpensive and readily commercially available in metalized form.

The heat reflective metal coating 25 preferably comprises an extremely thin layer of aluminum applied by a vacuum deposition process. While it is contemplated that other reflective metals may be employed for their heat reflective properties, it has been found that aluminum uniquely lends itself to vapor deposition and, when vapor deposited, provides distinctively high reflectivity due to its silvery brilliance, and also possesses a high degree of adherence to the film substrate.

Importantly and critically, the reflective, metallic component of the present invention is applied as an extremely thin coating on the polymeric film substrate. In particular, the metal coating is provided on a thin, polymeric film, and the coating itself has a thickness of less than about 0.1 micron, and preferably a thickness of about 0.003 to about 0.05 micron, which has been shown to be sufficient to produce excellent results, providing excellent reflectivity, durability, flexibility and resistance to abrasion. It is contemplated that coating thickness may be varied somewhat without significant sacrifice of reflectivity or flexibility, as may be determined by a few field trials.

Surprisingly, it has been found that although the preferred metal coating is extremely thin, such a thin coating is a highly effective reflector of infra-red radiation. Furthermore, the thinness of the composite metalized film enables it to stretch or otherwise distort without rupture and without any significant effect on the flexibility of the foamed substrate. It provides an essentially unbroken surface which is highly reflective to infra-red radiation. Although the thin metal coating may alone be somewhat vulnerable to abrasion damage, this vulnerability is substantially less than is the case with thin metal foils. Abrasion damage is minimized by the provision of the thin, flexible polymeric film as a substrate for the metal coating, and further by the presence of the resilient foam insulating layer as a substrate for the metalized film.

Suitable metalized polymeric films comprised of polyester coated with aluminum are available commercially, primarily for decorative purposes and for functional purposes in connection with packaging. A metal coating of aluminum having a thickness of about 0.03 micron produces excellent results. The polyester films typically have a thickness of about 12 microns. The thin metal coating is applied to the film by physical vapor deposition methods well known in the art, as by thermal evaporation of the metal under vacuum in which the vapor-phase metal atoms are recondensed or deposited onto the film as it is passed through a vacuum chamber. One such suitable metalized film is SM-1619, a single-sided, aluminized, 12 micron polyester film developed by Foilmark, Inc. of Newburyport, Mass.

Figure 2:
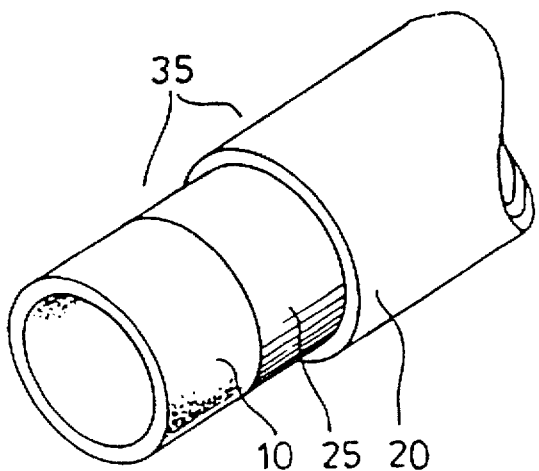
FIGS. 2 and 3 illustrate schematically alternative embodiments of the reflective foam sleeve of the present invention.
Figure 3:
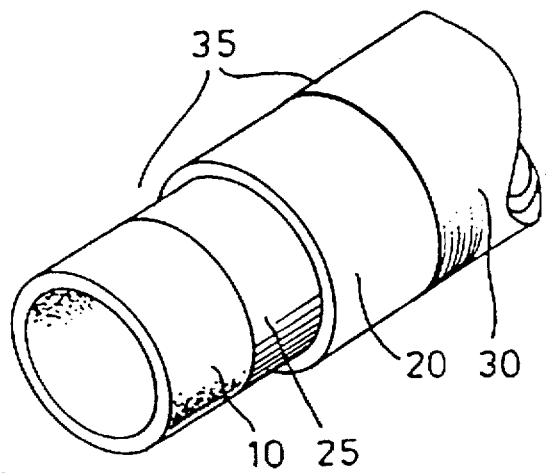

As can be seen in FIG. 1, the heat reflective metal coating 25 is provided on the outer surface of the polymeric film 20, with the inner surface of the polymeric film facing the foam insulating layer 10. As a protection against abrasion, the metal coating layer 25 may be advantageously situated on the inner surface of the polymeric film, closest to the foam insulating layer, as can be seen in FIG. 2. It is further contemplated that metal coatings 25, 30 may be situated on both the inner and outer surfaces of the polymeric film 20, as can be seen in FIG. 3. In the alternative embodiments illustrated in FIGS. 2 and 3, the susceptibility of the metal coating to abrasion damage is reduced, in that even if the outermost surface of the film is damaged by scratches or abrasions, there will always remain an unaffected inner metal layer, thereby maintaining at least some of the beneficial reflectivity of the sleeve over a prolonged period of time.

The metalized polymeric cover layer 35 of this invention is bonded to the foam insulating layer 10 at the interface of the foam layer and the cover layer. It is preferred that the cover layer be bonded to the foam layer by an adhesive. However, the foam layer 10 may be formed inside the composite cover layer 35, in which case the foamed insulating material itself, when cured, constitutes its own "adhesive."

It is important that the adhesive be reasonably flexible, heat resistant and ideally heat-settable. Suitable adhesives have been found to be polyurethanes or phenolic/nitrile or acrylic adhesives.

A suitable commercially available adhesive is a phenolic/nitrile adhesive manufactured by Norwood Industries, Inc. of Malvern, Pa. Another suitable adhesive is a heat activated, water based cross-linkable polyurethane adhesive. Silicone adhesives may also be suitable, but are generally not found to be a cost efficient alternative.

The adhesive is preferably conveniently pre-applied to the metalized polymeric film 35, as is typically available from commercial suppliers. Such an embodiment provides a simple and convenient method for handling the adhesive, thereby producing beneficial results. In particular, the adhesive is applied to the surface of polymeric film 20 opposite to the surface carrying the metal coating 25. In the alternative embodiments shown in FIGS. 2 and 3, the adhesive may be applied to the surface of the inner metal coating 25 of the metalized polymeric film, thereby leaving exposed either the surface of the polymeric film 20, in the case of FIG. 2, or the surface of the second, outer metal coating 30, in the case of FIG. 3.

As an alternative to heat settable adhesives, the adhesive employed may be a contact adhesive sprayed onto the foam sleeve prior to application of the metalized film. Alternatively, a cover sheet may be provided for protection of a layer of adhesive on the film, the cover sheet being peeled off in order to expose the adhesive. The adhesive is thus activated for application of the metalized polymeric film to the foam tube.

The present invention further provides a method of making the reflective foam sleeve as herein described. The preferred method comprises the steps of forming a tubular layer comprising a flexible, resilient foamed insulating material; forming an exterior cover layer for the tubular layer, the exterior cover layer comprising a metalized polymeric film, the metalized polymeric film comprising a flexible polymeric film and a nonporous, thin coating of heat reflective metal deposited on at least one surface of the polymeric film; and bonding the metalized polymeric film to the outer surface of the tubular layer.

Alternatively, the method comprises first forming the exterior cover layer and thereafter forming the foamed tubular layer inside the exterior cover layer, the foamed material of the tubular layer bonding the resulting tubular layer to the exterior cover layer as the foamed material is cured.

Figure 4:
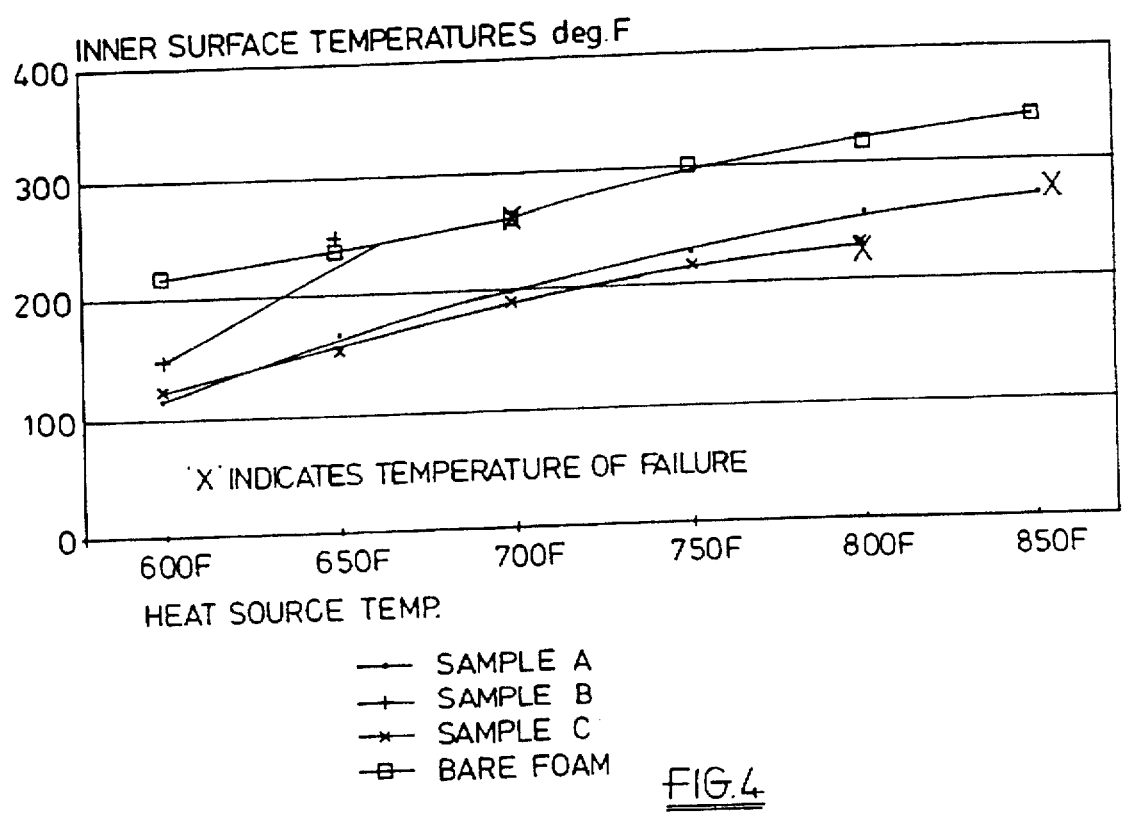
FIG. 4 is a graph illustrating thermal resistance of various reflective foam products under conditions of increasing temperatures.

Further illustration of the invention is provided in and by the following Examples. All Examples were sleeved over a bare black rubber hose and positioned about one inch from a heat source. The Examples were exposed and tested under conditions of increasing temperatures. Temperature readings were taken using thermocouples placed on the sleeve surface and on the external surface of the black hose. Testing of the Examples began at an initial temperature reading of 600° F., while testing of the bare foam to provide a baseline was started at 400° F., for comparison. The temperature was increased by increments of 50° F. after 30 minutes at each increment, until each Example began to degrade from the heat. The test results are indicated in Tables I and II below, and are graphically indicated in FIG. 4, where an "X" indicates the temperature at which each Example showed signs of degradation.

Bare Foam

A PVC/nitrile foam sleeve was provided as a baseline reference, the sleeve having a wall thickness of about ½", the inner diameter measuring about 1⅜" and the outer diameter measuring about 1⅞. The sleeving was thermally resistant to about 600° F., at which point it began to show signs of degradation.

EXAMPLE A

The same PVC/nitrile foam sleeve was provided with an aluminum deposition layer applied by way of transfer film, as manufactured by Kurz Hasting, a separate, additional 12 micron polyester film, and Norwood phenolic/nitrile adhesive on the inner surface of the polyester film. The sleeving was thermally resistant to about 850° F.

EXAMPLE B

The same PVC/nitrile foam sleeve was also provided with an aluminum deposition layer applied by way of Kurz Hasting transfer film, as well as the same Norwood phenolic/nitrile adhesive, as in Example A. However, no polyester film was provided between the aluminum layer and the adhesive. The sleeving provided more thermal resistance than the bare foam sleeve, but was thermally resistant to only about 700° F.

EXAMPLE C

The same PVC/nitrile foam sleeve was provided with a 12 micron aluminized polyester film supplied by Camvac (Europe) Ltd. The aluminized film was then coated with a heat activated polyurethane adhesive by Rexham Corporation and bonded to the foam sleeve. The sleeving was thermally resistant to about 815° F.

Table I demonstrates the test results, with all temperatures in degrees Fahrenheit.

TABLE I

| Reflective Product | Source Temp. | Outer Surface Temp. | Inner Surface Temp. |
|---|---|---|---|
| Example A | 603 | 286 | 117 |
|  | 649 | 295 | 168 |
|  | 700 | 323 | 199 |
|  | 751 | 350 | 224 |
|  | 802 | 378 | 254 |
|  | 852 | 415 | 267 |
| Example B | 605 | 315 | 149 |
|  | 647 | 339 | 245 |
|  | 703 | 370 | 257 |
| Example C | 606 | 265 | 125 |
|  | 659 | 292 | 155 |
|  | 701 | 313 | 190 |
|  | 750 | 336 | 216 |
|  | 817 | 368 | 228 |
| Bare Foam | 603 | 384 | 217 |
|  | 653 | 426 | 235 |
|  | 701 | 467 | 256 |
|  | 747 | 512 | 299 |
|  | 803 | 563 | 312 |
|  | 845 | 606 | 337 |

Table II demonstrates for comparison the inner surface temperature and resulting degree of protection for each Example at the same temperature, 700° F.

TABLE II

| Reflective Product | Heat Source | Inner Surface Temp. | Degree of Protection |
|---|---|---|---|
| Bare Foam | 700° F. | 256° F. | — |
| Example A | 700° F. | 199° F. | +57° F. |
| Example B | 700° F. | 257° F. | −1° F. |
| Example C | 700° F. | 190° F. | +66° F. |

The test results illustrate the importance of the reflective surface to keep the inner surface cool at a given heat source temperature setting, and more importantly the use of a polymeric film layer to reduce the inner surface temperature and thereby protect the substrate.

While Example B exhibited beneficial results as compared to the bare foam at low temperatures, it offered very little in both protection and endurance as compared to Examples A and C which employed a combination of aluminum, polyester film, and adhesive. Example B utilized the Kurz Hasting transfer film with phenolic/nitrile adhesive from Norwood, but there was no layer of polyester film; instead, Example B merely provided aluminum on adhesive, thus showing the importance of the polyester film between the aluminum and the adhesive as illustrated by Examples A and C.

Table II demonstrates that with a 700° F. heat source one inch away, by incorporating a polymeric film layer in the sleeving, as in Examples A and C, the inner surface temperature is reduced and the hose or cable substrate is protected. In contrast, the use of merely aluminum and adhesive, as in Example B, does very little to reduce the inner surface temperature, which attains the same inner surface temperature as that reached by the bare foam sample, namely the same temperature as the bare black rubber hose.

What is claimed is:

1. A sleeving product suitable for use as a barrier for resisting heat transfer between an external heat source and an elongated substrate, comprising:
    a) a tubular layer comprising a flexible, resilient foamed insulating material; and
    b) an exterior cover layer bonded to one surface of said tubular layer, said cover layer comprising a metalized polymeric film, said metalized polymeric film comprising a flexible polymeric film and a nonporous, thin coating of heat reflective metal having a thickness of less than about 0.1 micron applied to at least one surface of said polymeric film.

2. The sleeving product of claim 1, wherein said heat reflective metal coating comprises a vapor deposited coating comprised of said reflective metal.

3. The sleeving product of claim 2, wherein said heat reflective metal comprises aluminum.

4. The sleeving product of claim 2, wherein said heat reflective metal coating is applied to the outer surface of said polymeric film.

5. The sleeving product of claim 2, wherein said heat reflective metal coating is applied to the inner surface of said polymeric film.

6. The sleeving product of claim 2, wherein said heat reflective metal is applied to the inner and outer surfaces of said polymeric film.

7. The sleeving product of claim 1, wherein said polymeric film comprises polyester.

8. The sleeving product of claim 7, wherein said polymeric film comprises a thickness of about 12 microns.

9. The sleeving product of claim 1, wherein said metal coating comprises a thickness of about 0.003 to about 0.05 micron.

10. The sleeving product of claim 9, wherein said metal coating comprises a thickness of about 0.03 micron.

11. The sleeving product of claim 1, wherein said sleeving product further comprises an adhesive for bonding said cover layer to said tubular layer.

12. The sleeving product of claim 11, wherein said adhesive comprises a flexible, heat resistant adhesive.

13. The sleeving product of claim 12, wherein said adhesive is pre-applied to said polymeric film surface of said exterior cover layer.

14. The sleeving product of claim 12, wherein said adhesive comprises polyurethane.

15. The sleeving product of claim 12, wherein said adhesive comprises phenolic/nitrile adhesive.

16. The sleeving product of claim 12, wherein said adhesive comprises acrylic.

* * * * *

UNITED STATES PATENT AND TRADEMARK OFFICE
CERTIFICATE OF CORRECTION

PATENT NO. : 5,718,956
DATED : February 17, 1998
INVENTOR(S) : Gladfelter, et. al.

It is certified that error appears in the above-identified patent and that said Letters Patent is hereby corrected as shown below:

Claim 16, line 2, after "acrylic" insert --adhesive--.

Signed and Sealed this

Second Day of June, 1998

Attest:

BRUCE LEHMAN

Attesting Officer

Commissioner of Patents and Trademarks